(12) United States Patent
Shahparnia et al.

(10) Patent No.: US 9,250,719 B2
(45) Date of Patent: Feb. 2, 2016

(54) ACTIVE STYLUS WITH FILTER

(75) Inventors: Shahrooz Shahparnia, Campbell, CA (US); Kishore Sundara-Rajan, San Jose, CA (US); Trond Jarle Pedersen, Trondheim (NO); Vemund Kval Bakken, Menlo Park, CA (US); James D. Lyle, Santa Clara, CA (US)

(73) Assignee: Atmel Corporation, San Jose, CA (US)

( * ) Notice: Subject to any disclaimer, the term of this patent is extended or adjusted under 35 U.S.C. 154(b) by 415 days.

(21) Appl. No.: 13/329,274

(22) Filed: Dec. 17, 2011

(65) Prior Publication Data

US 2013/0106715 A1 May 2, 2013

Related U.S. Application Data

(60) Provisional application No. 61/553,114, filed on Oct. 28, 2011.

(51) Int. Cl.
*G06F 3/0354* (2013.01)

(52) U.S. Cl.
CPC .. *G06F 3/03545* (2013.01); *G06F 2203/04807* (2013.01)

(58) Field of Classification Search
CPC .............. G06F 3/03545; G06F 2203/04807
USPC ....................................................... 345/173
See application file for complete search history.

(56) References Cited

U.S. PATENT DOCUMENTS

| | | |
|---|---|---|
| 4,695,680 A | 9/1987 | Kable |
| 5,973,677 A | 10/1999 | Gibbons |
| 7,612,767 B1 | 11/2009 | Griffin |
| 7,663,607 B2 | 2/2010 | Hotelling |
| 7,864,503 B2 | 1/2011 | Chang |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 8,217,902 B2 | 7/2012 | Chang |
| 8,723,824 B2 | 5/2014 | Myers |
| 2002/0039092 A1* | 4/2002 | Shigetaka ..................... 345/156 |
| 2005/0171714 A1 | 8/2005 | Ely et al. |

(Continued)

FOREIGN PATENT DOCUMENTS

WO    WO 2012/129247    9/2012

OTHER PUBLICATIONS

Kyung, Ki-Uk et al., "wUbi-Pen : Windows Graphical User Interface Interacting with Haptic Feedback Stylus," *SIGGRAPH*,, Los Angeles, California, Aug. 2008.

(Continued)

*Primary Examiner* — Amr Awad
*Assistant Examiner* — Andre Matthews
(74) *Attorney, Agent, or Firm* — Baker Botts L.L.P.

(57) ABSTRACT

In one embodiment, a method includes receiving at a stylus a receive signal from a device. The stylus includes one or more computer-readable media embodying logic, and the device includes a touch sensor. The receive signal is received at the stylus through the touch sensor of the device and one or more electrodes of the stylus. The method includes filtering the receive signal for processing by the logic and processing, by the logic, the receive signal as filtered.

20 Claims, 5 Drawing Sheets

(56) References Cited

U.S. PATENT DOCUMENTS

| | | |
|---|---|---|
| 2008/0238885 A1 | 10/2008 | Zachut |
| 2008/0309635 A1 | 12/2008 | Matsuo |
| 2009/0078474 A1 | 3/2009 | Fleck et al. |
| 2009/0095540 A1 | 4/2009 | Zachut |
| 2009/0115725 A1 | 5/2009 | Shemesh |
| 2009/0127005 A1 | 5/2009 | Zachut |
| 2009/0153152 A1 | 6/2009 | Maharyta |
| 2009/0184939 A1 | 7/2009 | Wohlstadter |
| 2009/0251434 A1 | 10/2009 | Rimon |
| 2009/0315854 A1 | 12/2009 | Matsuo |
| 2010/0006350 A1 | 1/2010 | Elias |
| 2010/0090988 A1 | 4/2010 | Park |
| 2010/0155153 A1 | 6/2010 | Zachut |
| 2010/0292945 A1 | 11/2010 | Reynolds |
| 2010/0315384 A1* | 12/2010 | Hargreaves et al. .......... 345/179 |
| 2011/0007029 A1 | 1/2011 | Ben-David |
| 2011/0050618 A1 | 3/2011 | Murphy et al. |
| 2012/0013555 A1 | 1/2012 | Maeda et al. |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2012/0327041 A1 | 12/2012 | Harley |
| 2012/0327042 A1 | 12/2012 | Harley et al. |
| 2012/0331546 A1* | 12/2012 | Falkenburg et al. ............ 726/16 |
| 2013/0021303 A1 | 1/2013 | Martin et al. |
| 2013/0076612 A1 | 3/2013 | Myers |
| 2013/0106713 A1 | 5/2013 | Shahparnia |
| 2013/0106795 A1 | 5/2013 | Sundara-Rajan |

OTHER PUBLICATIONS

Lee, Johnny C. et al., "Haptic Pen: A Tactile Feedback Stylus for Touch Screens," *UIST '04*, vol. 6, Issue 2, Santa Fe, New Mexico, Oct. 2004.

Song, Hyunyoung et al., "Grips and Gestures on a Multi-Touch Pen," *CHI 2011, Session: Flexible Grips & Gestures*, Vancouver, BC, Canada, May 2011.

Tan, Eng Chong et al., "Application of Capacitive Coupling to the Design of an Absolute-Coordinate Pointing Device," IEEE Transactions on Instrumentation and Measurement, vol. 54, No. 5, Oct. 2005.

U.S. Appl. No. 61/454,936, filed Mar. 21, 2011, Myers.

U.S. Appl. No. 61/454,950, filed Mar. 21, 2011, Lynch.

U.S. Appl. No. 61/454,894, filed Mar. 21, 2011, Rothkopf.

Kishore Sundara-Rajan et al., U.S. Appl. No. 13/335,296, Non-final Office Action dated Oct. 16, 2013.

Kishore Sundara-Rajan et al., U.S. Appl. No. 13/335,296, Response to Non-final Office Action dated Jan. 6, 2014.

Kishore Sundara-Rajan et al., U.S. Appl. No. 13/335,296, Non-final Office Action dated Jun. 16, 2014.

Kishore Sundara-Rajan et al., U.S. Appl. No. 13/335,296, Response to Non-final Office Action dated Oct. 16, 2014.

Kishore Sundara-Rajan et al., U.S. Appl. No. 13/335,296, Final Office Action dated Feb. 17, 2015.

Kishore Sundara-Rajan et al., U.S. Appl. No. 13/335,296, Request for Continued Examination and Amendment dated May 18, 2015.

S. Shahparnia et al., U.S. Appl. No. 13/329,268, Non-final Office Action dated Jan. 3, 2014.

S. Shahparnia et al., U.S. Appl. No. 13/329,268, Response to Non-final Office Action dated May 5, 2014.

S. Shahparnia et al., U.S. Appl. No. 13/329,268, Final Office Action dated Sep. 5, 2014.

S. Shahparnia et al., U.S. Appl. No. 13/329,268, Response to Final Office Action dated Dec. 5, 2014.

S. Shahparnia et al., U.S. Appl. No. 13/329,268, Final Office Action dated Feb. 5, 2015.

S. Shahparnia et al., U.S. Appl. No. 13/329,268, Response to Final Office Action dated Apr. 6, 2015.

S. Shahparnia et al., U.S. Appl. No. 13/329,268, Request for Continued Examination dated May 27, 2015.

* cited by examiner

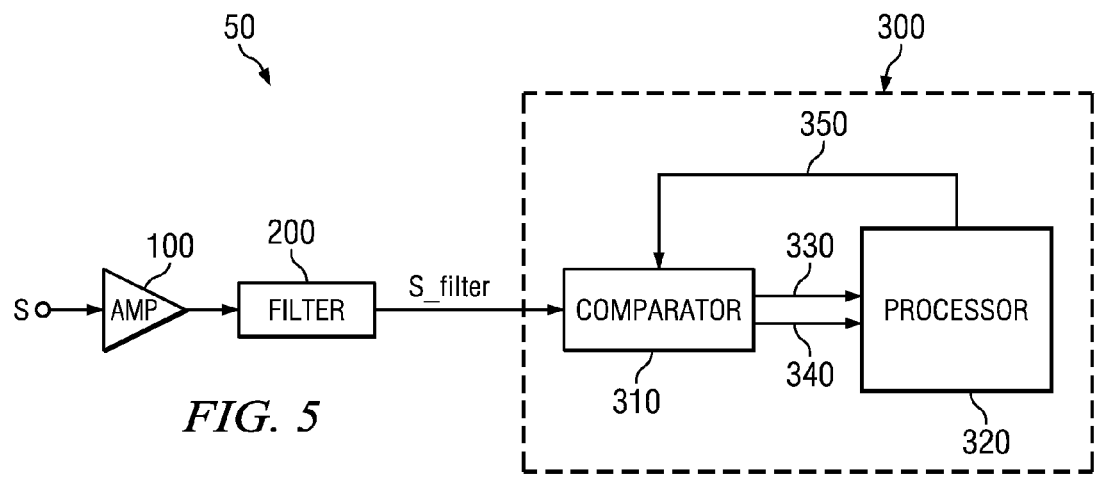
FIG. 5
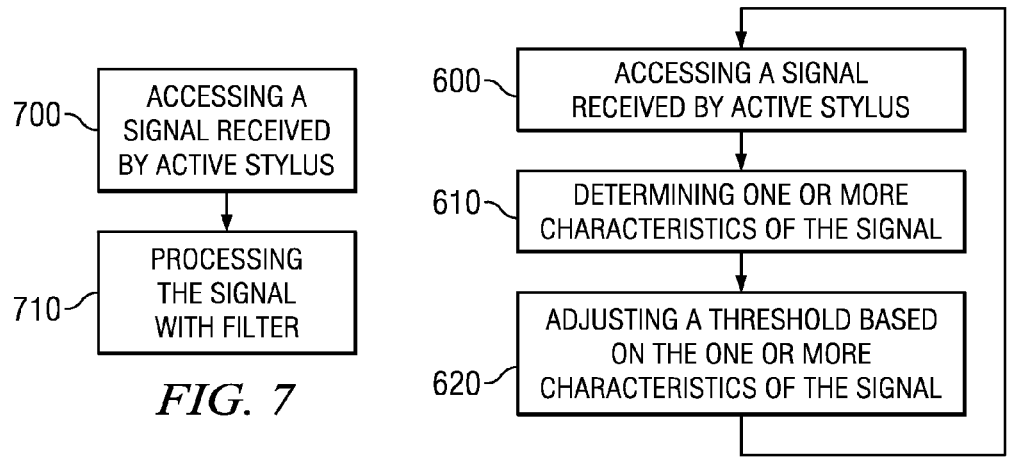
FIG. 7
FIG. 6
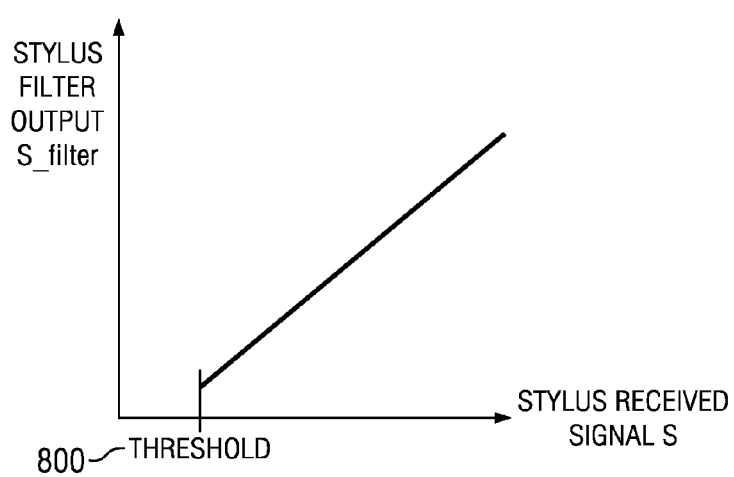
FIG. 8

ACTIVE STYLUS WITH FILTER

RELATED APPLICATION

This application claims the benefit, under 35 U.S.C. §119 (e), of U.S. Provisional Patent Application No. 61/553,114, filed 28 Oct. 2011, which is incorporated herein by reference.

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as, for example, resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

BRIEF DESCRIPTION OF THE DRAWINGS

FIG. 5 illustrates an example controller in an active stylus.

FIG. 6 illustrates an example method for adjusting a received signal threshold in an active stylus.

FIG. 7 illustrates an example method for filtering a signal received by an active stylus.

FIG. 8 illustrates an example filter in an active stylus.

DESCRIPTION OF EXAMPLE EMBODIMENTS

Figure 1:
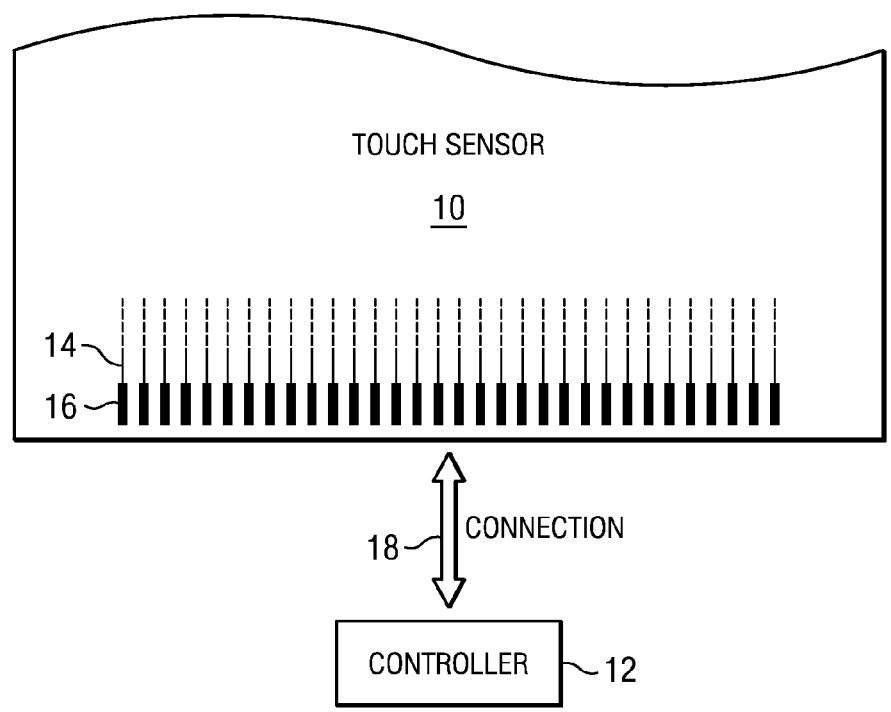
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, guard electrode, drive electrode, or sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as a 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate)

(PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices (PLDs) or programmable logic arrays (PLAs), application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
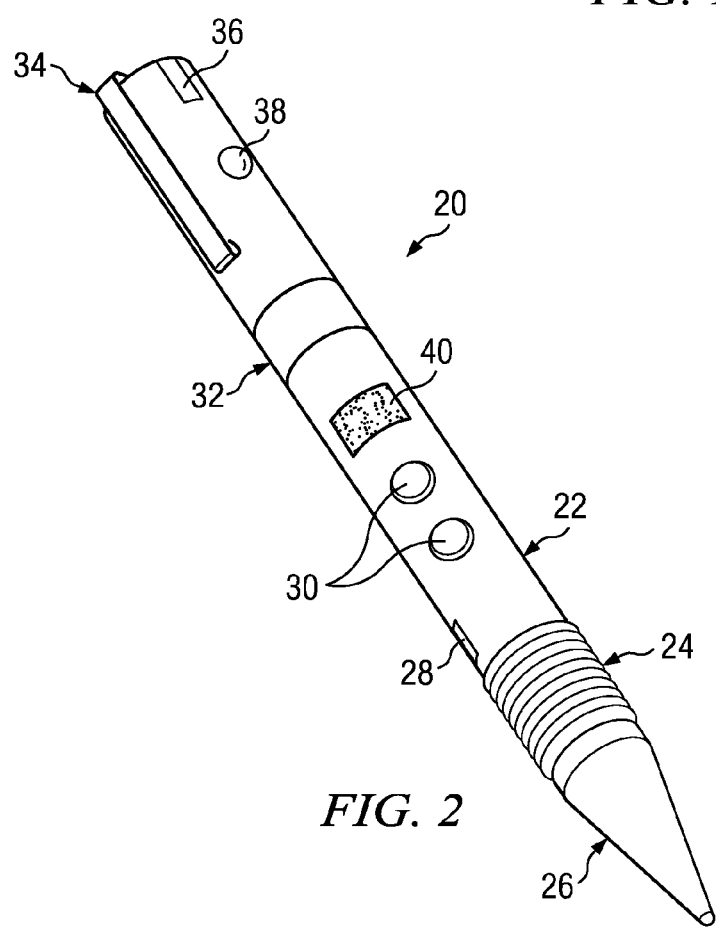
FIG. 2 illustrates an example active stylus exterior.

FIG. 2 illustrates an example exterior of an example active stylus 20. Active stylus 20 may include one or more components, such as buttons 30 or sliders 32 and 34 integrated with an outer body 22. These external components may provide for interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. The device may by any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g. 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis, while one or more wheel sliders 32 may be aligned along the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using a FPC.

Active stylus 20 may have one or more components configured to provide feedback to or accepting feedback from a user, such as, for example and without limitation, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator. As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionally. For example and not by way of limitation, dragging a finger across modified surface area 40 may initiate an interaction, such as data transfer, between active stylus 20 and a device.

One or more components of active stylus 20 may be configured to communicate data between active stylus 20 and the device. For example, active stylus 20 may include one or more tips 26 or nibs. Tip 26 may include one or more electrodes configured to communicate data between active stylus 20 and one or more devices or other active styluses. Tip 26 may be made of any suitable material, such as a conductive material, and have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
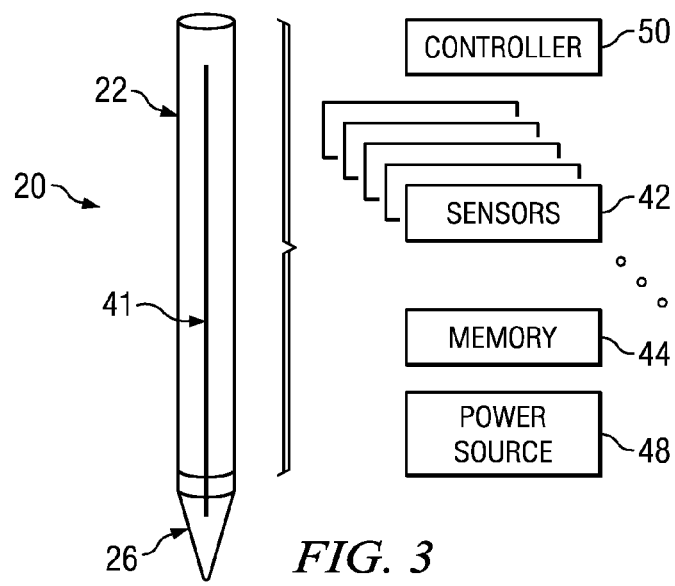
FIG. 3 illustrates an example active stylus interior.

FIG. 3 illustrates an example internal components of example active stylus 20. Active stylus 20 may include one or more internal components, such as a controller 50, sensors 42, memory 44, or power source 48. In particular embodiments, one or more internal components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users.

Controller 50 may be a microcontroller or any other type of processor suitable for controlling the operation of active stylus 20. Controller 50 may be one or more ICs—such as, for example, general-purpose microprocessors, microcontrollers, PLDs, PLAs, or ASICs. Controller 50 may include a processor unit, a drive unit, a sense unit, and a storage unit. The drive unit may supply signals to electrodes of tip 26 through center shaft 41. The drive unit may also supply signals to control or drive sensors 42 or one or more external components of active stylus 20. The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device. As an example and not by way of limitation, power may be inductively transferred between power source 48 and a power source of the device.

Figure 4:
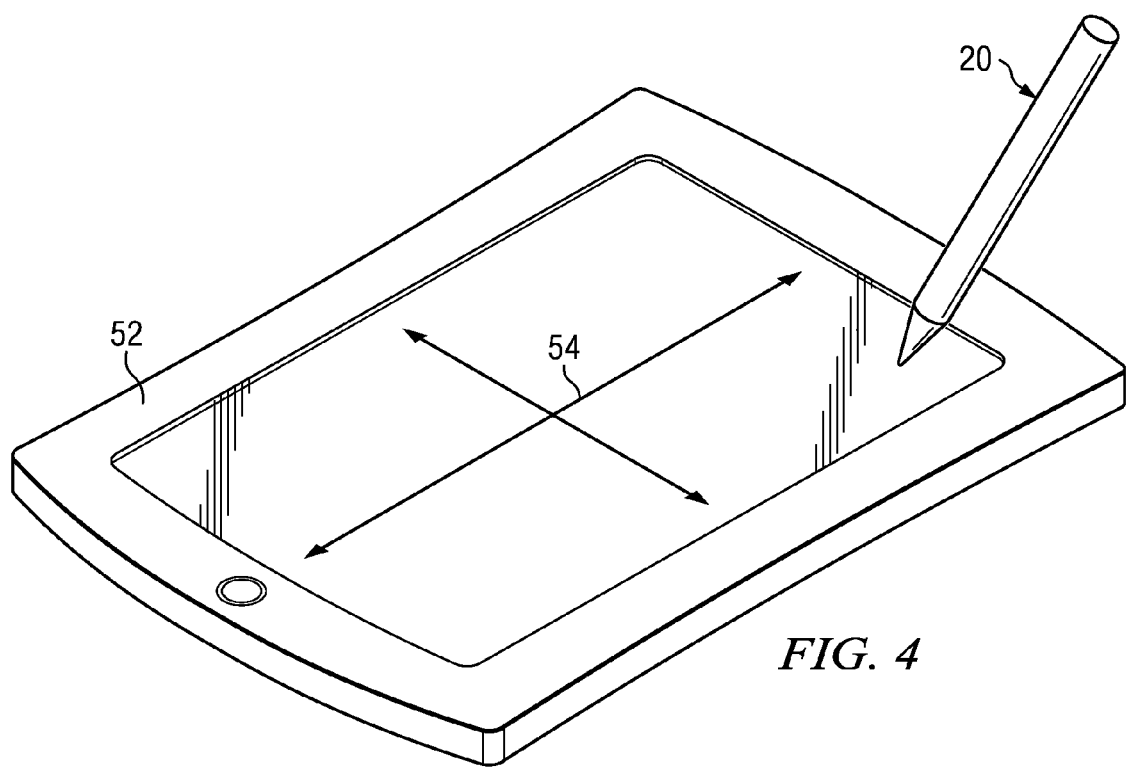
FIG. 4 illustrates an example active stylus with touch sensor device.

FIG. 4 illustrates an example active stylus 20 with an example device 52. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As example and not by way of limitation, device 52 electronics may include circuitry or other electronics for wireless communication to or from device 52, execute programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of data between active stylus 20 and device 52. As an example and not by way of limitation, active stylus 20 may be synchronized to device through a pre-determined bit sequence transmitted by the touch sensor of device 52. As another example, active stylus 20 may be synchronized to device by processing the drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example and not by way of limitation, when active stylus 20 is brought in contact with or in the proximity of touch-sensitive area 54 of device 52, signals generated by active stylus 20 may influence capacitive nodes of touch-sensitive area of device 52 or vice versa. As another example, a power source of active stylus 20 may be inductively charged through the touch sensor of device 52, or vice versa. Although this disclosure describes particular interactions and communications between active stylus 20 and device 52, this disclosure contemplates any suitable interactions and communications through any suitable means, such as mechanical forces, current, voltage, or electromagnetic fields.

In particular embodiments, measurement signal from the sensors of active stylus 20 may initiate, provide for, or terminate interactions between active stylus 20 and one or more devices 52 or one or more users, as described above. Interaction between active stylus 20 and device 52 may occur when active stylus 20 is contacting or in proximity to device 52. As an example and not by way of limitation, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

Active stylus 20 may receive signals from external sources, including device 52, a user, or another active stylus. Active stylus 20 may encounter noise when receiving such signals. As examples, noise may be introduced into the received signals from data quantization, limitations of position-calculation algorithms, bandwidth limitations of measurement hardware, accuracy limitations of analog front ends of devices with which active stylus 20 communicates, the physical layout of the system, sensor noise, charger noise, device noise, stylus circuitry noise, or external noise. The overall noise external to active stylus 20 may have frequency characteristics covering a wide range of the spectrum, including narrow band noise and wide band noise, as well.

Active stylus 20 may transmit signals based in part on the determination that it has received a signal, and not simply noise, from a signal source. As an example, active stylus 20 may determine whether it has received a signal from device 52 by comparing the received signal to a signal threshold. If the received signal satisfies the threshold requirement (e.g., meets the minimum value of this signal threshold), active stylus 20 may process the received signal, including, for example, amplifying or phase-shifting the received signal, in order to create a transmit signal to transmit back to device 52. It may be desirable for active stylus 20 to, for example, dynamically adjust the threshold for determining that a received signal contains a signal from device 52, or any other signal source, and not merely noise. As an example, if the signal threshold is too low, active stylus 20 may incorrectly determine that a pure noise signal is actually a signal from device 52, proceed to process the noise signal, and incorrectly transmit a response signal. As another example, if signal threshold is too high, active stylus 20 may incorrectly determine that a signal from device 52 is purely a noise signal and fail to process the received signal and transmit a response signal. The threshold adjustment may be based on some factors and may be done dynamically.

FIG. 5 illustrates an example controller 50, which may be incorporated in an active stylus (e.g., active stylus 20). In particular embodiments, a signal S is received by one or more electrodes capable of sensing signals in active stylus 20. These electrodes may reside on active stylus tip 26. The signal S received by the electrodes in active stylus 20 may then be transmitted from the electrodes to controller 50. In particular embodiments, signal S is transmitted to controller 50 via center shaft 41. Controller 50, as discussed above, may include, without limitation, a drive unit, a sense unit, a storage unit, and a processor unit. The components illustrated in FIG. 5 may reside in controller 50, and in certain embodiments may be a part of the processor unit of controller 50.

In particular embodiments including the one illustrated by FIG. 5, received signal S may be amplified by an amplifier 100. Amplifier 100 may be any suitable amplifier, including a digital or an analog amplifier. After the signal S is amplified, it may be filtered by a filter 200. In some embodiments, filter 200 may be an analog filter including analog circuit components, such as one or more resistors, capacitors, or inductors. In other embodiments, filter 200 may be a digital filter, such as a finite-impulse-response (FIR) filter, or a Kalman filter implemented, for example, on a processor. Filter 200 may be any suitable filter for any type of processing of the received signal (e.g., signal S), including, for example, a filter for noise removal. Filter 200 may be, for example and without limitation, a low pass filter, a band pass filter, or a high pass filter. In particular embodiments, filter 200 may be a band pass filter whose frequency characteristics are designed to attenuate noise and amplify a signal. Filter 200 may also be used to boost signal strength of the received signal at active stylus 20.

Referring to FIG. 5, amplified and/or filtered signal S, denoted S_filter, proceeds to control processor 300. Control processor 300 may be a microcontroller. Control processor 300 includes comparator 310 and processor 320. Comparator 310 may, in particular embodiments, be an analog comparator, including analog circuitry. In other embodiments, comparator 310 may be a digital comparator, and in yet other embodiments, comparator 310 may be a processor. Comparator 310 receives as input S_filter. Comparator 310 then compares S_filter to at least one signal threshold to determine whether S_filter represents noise alone or a received signal in addition to noise. As an example, if S_filter is a voltage, comparator 310 compares S_filter to a voltage threshold value V_th to determine whether S_filter is less than, equal to, or greater than V_th. In this example, if S_filter is equal to or greater than V_th, comparator 310 determines that S_filter contains a signal, and not merely noise, and outputs this determination to processor 320 via output line 330. In particular embodiments, if S_filter meets or exceeds the signal threshold V_th, processor 320 may then output S_filter for further processing by active stylus 20. In addition to having a signal threshold V_th, comparator 310 may also have a threshold for diagnostic purposes. As an example, comparator 310 may have a second threshold, V_diag, with a value different from V_th, and the output of a comparison of S_filter and V_diag is sent to processor 320 via output line 340. In this example, the determination by comparator 310 whether S_filter meets or exceeds signal threshold V_th controls whether or not S_filter is processed further by active stylus 20, and the determination whether S_filter meets or exceeds diagnostic threshold V_diag allows processor 320 to determine future values of V_th or V_diag.

In the example embodiment of FIG. 5, comparator 310 may also output additional data to processor 320. Comparator 310 may analyze S_filter and output any type of information about S_filter to processor 320 via output line 340. As an example, comparator 310 may calculate the signal-to-noise ratio (SNR) of S_filter and send this information to processor 320. As another example, comparator 310 may determine the amplitude characteristics of S_filter and send this to processor 320. As yet another example, comparator 310 may determine the frequency characteristics of S_filter, including the bandwidth of S_filter, and send this to processor 320. As yet another example, comparator 310 may determine the phase characteristics of S_filter and send this to processor 320. Output line 340 may carry one or more signals containing any type of relevant information about S_filter from comparator 310 to processor 320.

As illustrated in the example embodiment of FIG. 5, processor 320 receives data from comparator 310 via output lines 330 and 340. Processor 320 may adjust threshold V_th or V_diag based on the data received from comparator 310. Additionally, processor 320 may adjust V_th or V_diag based on data received from any other components of active stylus 20, including other parts of controller 50 (such as the sense unit, drive unit, storage unit, or processor unit), memory 44, power source 48, or sensors 42. Processor 320 may send adjusted threshold values of V_th and V_diag to comparator 310 via output line 350. Additionally, processor 320 may send other types of data to comparator 310 via output line 350 or additional output lines, including, for example, SNR cutoff values. Although FIG. 5 illustrates a particular embodiment in which processor 320 receives data from comparator 310, processor 320 may also receive data from or send data to any part of active stylus 20. As an example, processor 320 may receive data regarding known characteristics (such as bandwidth, frequency, phase, amplitude, or synchronization patterns) of the signal of interest transmitted by a signal source such as device 52. As another example, processor 320 may receive data regarding the mode in which active stylus 20 is operating (such as, for example, a hover mode).

In particular embodiments, processor 320 may adjust V_th so that V_th is approximately proportional to the SNR of S_filter. As an example, if the SNR of S_filter is high, as may be the case when active stylus 20 is near to a signal source like device 52, processor 320 may adjust V_th upward, so that the new value of V_th is higher than the old value of V_th. This may allow for improved noise rejection by active stylus 20. As another example, if the SNR of S_filter is low or if the amplitude of S_filter is low, as may be the case when active stylus 20 is far from a signal source like device 52, processor 320 may adjust V_th downward, so that the new value of V_th is lower than the old value of V_th. This may allow for improved signal detection by active stylus 20 in low SNR or low amplitude situations.

In other embodiments, if processor 320 determines that comparator 310 is falsely triggering too frequently on S_filter (that is, if comparator 310 too frequently incorrectly determines that S_filter contains a signal when S_filter is purely noise), processor 320 may increase V_th to improve noise rejection. False triggering may occur more frequently in very low SNR situations where the amplitude or frequency characteristics of the noise are comparable to those of the signal. Thus, in particular embodiments, processor 320 may reduce V_th in low SNR situations until some minimum value of V_th is reached (where false triggering occurs too frequently), at which point processor 320 may increase V_th to prevent further false triggering. In other embodiments, processor 320 may reduce V_th in low SNR situations until some minimum SNR value for S_filter is reached (such as, for example, an SNR of 1), at which point processor 320 may increase V_th to prevent further false triggering.

In yet other embodiments, if processor 320 determines that comparator 310 is too frequently incorrectly rejecting S_filter as purely noise, processor 320 may decrease V_th to improve signal detection. Thus, in particular embodiments, processor 320 may increase V_th until some maximum value of V_th is reached (for example, where signal rejection occurs too frequently), at which point processor 320 may decrease V_th to prevent further signal rejection.

Processor 320 may use diagnostic threshold V_diag to determine if active stylus is operating in a low SNR range. For example, if V_th is set to 2 volts, V_diag is set to 1.5 volts, and S_filter is consistently in the range between 1.5 and 2 volts (without meeting or exceeding 2 volts), comparator 310 will reject S_filter as a noise signal. Processor 32, however, may have data indicating that S_filter is not pure noise (based, for example, on known characteristics of the signal transmitted by device 52). Processor 320 may analyze the fact that S_filter meets the diagnostic threshold, V_diag, and not the signal detection threshold, V_th, and determine that active stylus 20 is operating in a low SNR range.

In addition to analyzing current data from comparator 310 and other data sources from active stylus 20, processor 320 may access stored information. As an example, processor 320 may access prior data values received from comparator 310 (such as threshold comparison outputs, SNR of S_filter, or amplitude of S_filter) or other components of active stylus 20 to determine future values of V_th or V_diag. Prior data values accessed by processor 320 may, for example, be stored in processor 320 or in memory 44. Initial or prior values for V_th or V_diag may also be accessed or stored by processor 320.

FIG. 6 illustrates an example method for dynamically adjusting a signal detection threshold in active stylus 20. The method may start at step 600, where a signal received by active stylus 20 is accessed. With reference again to FIG. 5, in particular embodiments, this step may occur when control processor 300 receives S_filter from filter 200. At step 610, one or more characteristics of the signal are determined. In particular embodiments, this step may occur in control processor 300, with certain characteristics determined by comparator 310 (including, for example, whether a threshold is met) and certain characteristics determined by processor 320 (including, for example, SNR). In particular embodiments, one of the characteristics determined for the signal is whether the signal satisfies the threshold requirement based on the current value of the threshold. This may be determined by comparing the signal to the current value of the threshold. At step 620, a threshold is adjusted based on the one or more characteristics of the signal. This may result in the threshold having a new value. In particular embodiments, the steps illustrated in FIG. 6 may be repeated any number of times (e.g., any number of iterations). For example, during a second iteration, a second signal may be received (returning back to step 600). One or more characteristics may be determined for the second signal at step 610. Again, one of the characteristics determined for the second signal is whether the second signal satisfies the threshold requirement based on the current value of the threshold. Note that the current value of the threshold may have been adjusted during the previous iteration. At step 620, the threshold may be adjusted again based on the characteristics of the second signal.

In particular embodiments, processor 320 adjusts signal detection threshold V_th based on data received from comparator 310 and sends adjusted V_th to comparator 310 via output line 350. In this manner, comparator 310, output lines 330 and 340, processor 320, and output line 350 form a feedback loop for controlling the one or more signal thresholds against which S_filter is compared. Particular embodiments may repeat the steps of the method of FIG. 6, where appropriate. Moreover, although this disclosure describes and illustrates particular steps of the method of FIG. 6 as occurring in a particular order, this disclosure contemplates any suitable steps of the method of FIG. 6 occurring in any suitable order. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

FIG. 7 illustrates an example method for filtering a signal received by active stylus 20. The method may start at step 700, where a signal received by active stylus 20 is accessed. With reference again to FIG. 5, in particular embodiments, this step may occur when filter 200 receives signal S from amplifier 100. At step 710, the signal S is processed by filter 200. The output of filter 200, S_filter, may then be further processed by controller 50 or any other component of active stylus 20. In particular embodiments, no output S_filter is provided when certain conditions of filter 200 (for example, a threshold) are not met. Particular embodiments may repeat the steps of the method of FIG. 7, where appropriate. Moreover, although this disclosure describes and illustrates particular steps of the method of FIG. 7 as occurring in a particular order, this disclosure contemplates any suitable steps of the method of FIG. 7 occurring in any suitable order. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

As illustrated in the example embodiment of FIG. 8, active stylus 20 may have a filter 200 (or one or more filters that comprise filter 200) with a signal detection threshold 800. In one embodiment, if the received signal S does not meet or exceed the minimum signal detection threshold 800, filter 200 will not output a signal for further processing. That is, S_filter will have a value of 0 or, alternatively, will not be output by filter 200. This allows filter 200 to reject signals that may be noise rather than a communication from, for example, device 52. Filter 200 may have a threshold 800 that is dynamically assigned or adjusted. Additionally, filter 200 may have a threshold 800 that is based on the signal-to-noise ration (SNR) of received signal S, on the mode of operation of active stylus 20, or any other quantity that active stylus 20 has access to.

Figure 9:
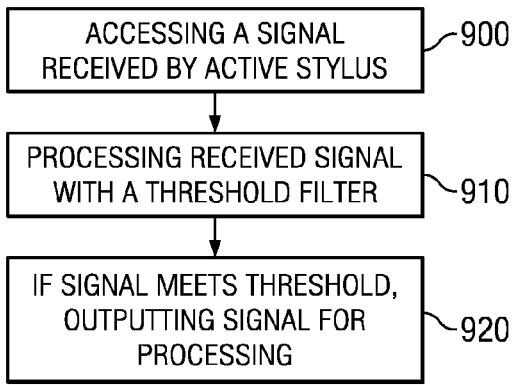
FIG. 9 illustrates an example method for filtering a signal received by an active stylus.

FIG. 9 illustrates an example method for filtering, with a threshold, a signal received by active stylus 20. The method may start at step 900, where a signal received by active stylus 20 is accessed. With reference again to FIG. 5, in particular embodiments, this step may occur when filter 200 receives signal S from amplifier 100. At step 910, the signal S is processed by filter 200 having a threshold 800. At step 920, if received signal S meets or exceeds threshold 800, then the output of filter 200, S_filter, may then be further processed by controller 50 or any other component of active stylus 20. In particular embodiments, when received signal S does not meet or exceed threshold 800, no output from filter 200, S_filter, is provided to controller 50 (or, in particular embodiments, a signal of value 0 is provided). Particular embodiments may repeat the steps of the method of FIG. 9, where appropriate. Moreover, although this disclosure describes and illustrates particular steps of the method of FIG. 9 as occurring in a particular order, this disclosure contemplates any suitable steps of the method of FIG. 9 occurring in any suitable order. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
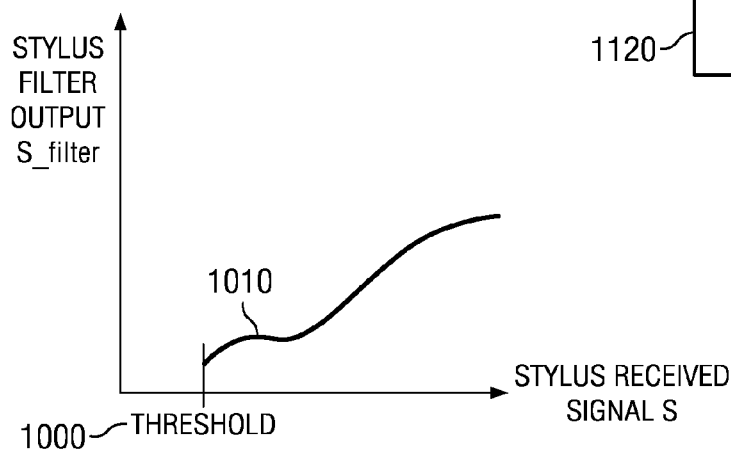
FIG. 10 illustrates an example filter in an active stylus.

FIG. 10 illustrates an example embodiment of active stylus 20 with a filter 200 with the characteristic of a non-linear gain. Although FIG. 10 depicts filter 200 with threshold 1000, filter 200 may have a non-linear gain without having threshold 1000. As an example of a non-linear gain, when the amplitude of received signal S is above threshold 1000 but still near threshold 1000, the gain (in particular embodiments, the ratio of S_filter to S) may be proportionally higher than when the amplitude of received signal S is more significantly above threshold 1000. This is illustrated in FIG. 10, where at location 1010, the gain of filter 200 is proportionally higher than for higher values of received signal S. The parameters of filter 200 may be adjusted in any number of ways, including, for example, having more nonlinear regions like location 1010 in the filter, to ensure that input signal S has the desired gain level applied to it depending on the value of S. This type of filter 200 may be useful in situations when active stylus 20 is in between drive lines of device 52, causing the amplitude of the received signal S to be low. As an example, if the amplitude of the received signal S is low but active stylus 20 must still transmit with sufficient power to be properly detected by device 52, a non-linear gain may be desirable.

Figure 11:
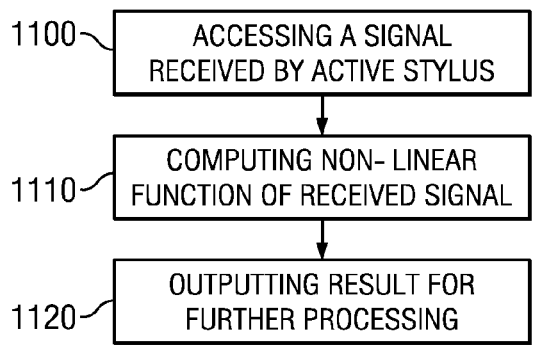
FIG. 11 illustrates an example method for filtering a signal received by an active stylus.

FIG. 11 illustrates an example method for filtering, with a non-linear gain, a signal received by active stylus 20. The method may start at step 1100, where a signal received by active stylus 20 is accessed. With reference again to FIG. 5, in particular embodiments, this step may occur when filter 200 receives signal S from amplifier 100. The signal S is processed by filter 200 having a non-linear gain, as typified by the filter output value S_filter at location 1010. At step 1110, a non-linear function of the received signal S may be computed (or, in particular embodiments, may be predetermined), and at step 1120, the output of filter 200, S_filter, may then be further processed by controller 50 or any other component of active stylus 20. In particular embodiments, with threshold 1000, when received signal S does not meet or exceed threshold 1000, no output from filter 200, S_filter, is provided to controller 50 (or, in particular embodiments, a signal of value 0 is provided). Particular embodiments may repeat the steps of the method of FIG. 11, where appropriate. Moreover, although this disclosure describes and illustrates particular steps of the method of FIG. 11 as occurring in a particular order, this disclosure contemplates any suitable steps of the method of FIG. 11 occurring in any suitable order. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Figure 12:
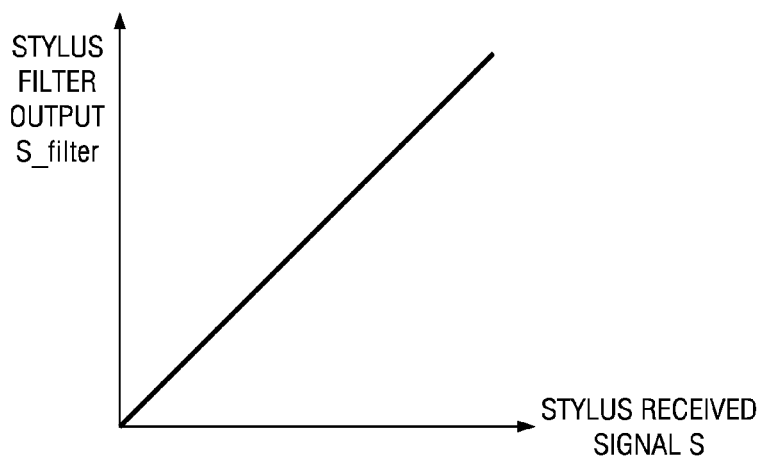
FIG. 12 illustrates an example filter in an active stylus.

FIG. 12 illustrates an example embodiment of active stylus 20 with filter 200 having the characteristic of a proportional gain. Although FIG. 12 depicts filter 200 without a threshold, filter 200 may have a proportional gain with a threshold. The value of the output of filter 200, S_filter, is proportional to the value of the received signal S. The parameters of filter 200 may be adjusted in any number of ways, including, for example, having a higher or lower proportional gain (or ratio of S_filter to S) to ensure that input signal S has the desired proportional gain level applied to it depending on the value of S. In particular embodiments, the signal transmitted from active stylus 20 to device 52 is a function of the signal S received by active stylus. Thus, a filter 200 with a proportional gain, as illustrated in FIG. 12, may be useful in situations when transmitting a signal proportional to the received signal is desirable. As an example, if active stylus 20 is close to device 52, it may be desirable for active stylus to transmit proportionally to the signal S that it receives, rather than transmitting at a high and constant energy level, in order to ensure that device 52 to be able to more accurately detect the location of active stylus 20.

Figure 13:
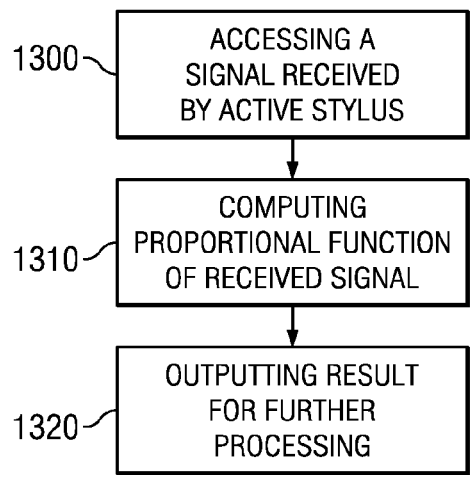
FIG. 13 illustrates an example method for filtering a signal received by an active stylus.

FIG. 13 illustrates an example method for filtering, with a proportional gain, a signal received by active stylus 20. The method may start at step 1300, where a signal received by active stylus 20 is accessed. With reference again to FIG. 5, in particular embodiments, this step may occur when filter 200 receives signal S from amplifier 100. At step 1310, the signal S is processed by filter 200 having a proportional gain, with filter output value S_filter being proportional to filter input S. A proportional function of the received signal S is computed (or, in particular embodiments, may be predetermined), and at step 1320, the output of filter 200, S_filter, may then be further processed by controller 50 or any other component of active stylus 20. In particular embodiments, output from filter 200, S_filter, is provided to controller 50, and active stylus 20 may transmit a signal proportional to received signal S. Particular embodiments may repeat the steps of the method of FIG. 13, where appropriate. Moreover, although this disclosure describes and illustrates particular steps of the method of FIG. 13 as occurring in a particular order, this disclosure contemplates any suitable steps of the method of FIG. 13 occurring in any suitable order. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Figure 14:
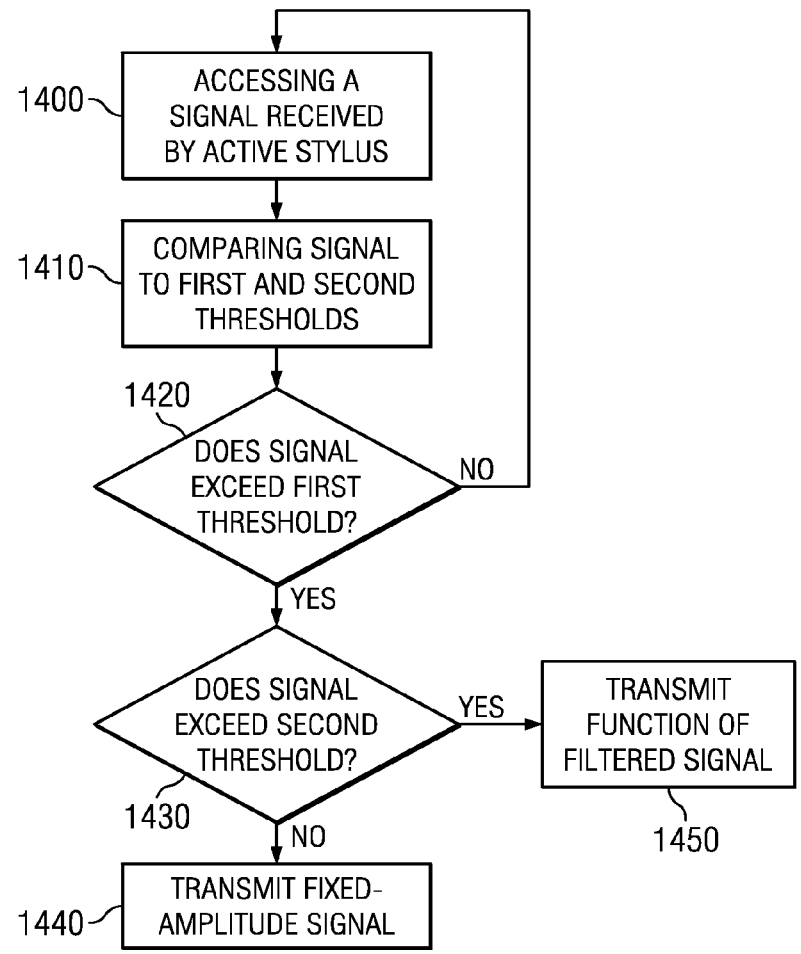
FIG. 14 illustrates an example method for transmitting a signal from an active stylus to a device.

Active stylus 20 may transmit a signal to device 52 based on the signal S that active stylus 20 received from device 52. In particular embodiments, the signal transmitted from active stylus 20 to device 52 is a function of the signal S received by active stylus, including, for example, a function of S_filter (itself a function of received signal S). FIG. 14 illustrates an example method for transmitting a signal from active stylus 20 to device 52 based on the signal S received by active stylus 20. The method may start at step 1400, where a signal received by active stylus 20 is accessed. With reference again to FIG. 5, in particular embodiments, this step may occur when filter 200 receives signal S from amplifier 100. At step 1410, received signal S is compared to first and second pre-determined thresholds. In particular embodiments, one or both of these thresholds may be a threshold (such as threshold 800 or threshold 1000) of filter 200, but in other embodiments, the first or second thresholds may be independent of any thresholds of filter 200. The first or second thresholds may be static pre-determined thresholds or dynamic pre-determined thresholds, and may be set by controller 50 or any other component of active stylus 20. At step 1420, a determination is made as to whether some characteristic of signal S, such as, for example, an amplitude of signal S, exceeds the first pre-determined threshold. If the amplitude of signal S does not exceed the first pre-determined threshold, then the method returns to step 1400, where another signal received by active stylus 20 is accessed, and the method restarts. If the amplitude of signal S does exceed the first pre-determined threshold, then the method proceeds to step 1430, where a determination is made as to whether the same characteristic of signal S, such as, for example, an amplitude of signal S, exceeds the second pre-determined threshold. If the amplitude of signal S does not exceed the second pre-determined threshold, then the method proceeds to step 1440, where active stylus 20 transmits a signal of fixed amplitude to device 52. In particular embodiments, the signal transmitted is a maximum-amplitude signal that may enable better performance of active stylus 20 in modes such as hover mode. If, at step 1430, the amplitude of signal S exceeds the second pre-determined threshold, then the method proceeds to step 1450, where active stylus 20 transmits a signal that is a function of the filtered version of signal S, S_filter. In particular embodiments, the function of S_filter may be non-linear. In yet other embodiments, the function of S_filter may be a phase change of S_filter or a multiplicative gain applied S_filter. In yet other embodiments, active stylus 20 may take one action if both the first and second thresholds are exceeded, and a second action if only the first (and not the second)

threshold is exceeded, including, but not limited to, transmitting different types of signals to device 52. As another example, active stylus 20 may filter or process signal S differently based on the specific combination of thresholds exceeded. As a particular embodiment, active stylus 20 may process signal S with one function (which may be linear or nonlinear, proportional, or constant, for example) when the first threshold is exceeded, and active stylus 20 may process signal S with another function (which may also be linear or nonlinear, proportional, or constant, for example) when the second threshold is exceeded. Active stylus 20 may have more than two thresholds, and more than two types of actions that are taken based on the combination of thresholds exceeded. Particular embodiments may repeat the steps of the method of FIG. 14, where appropriate. Moreover, although this disclosure describes and illustrates particular steps of the method of FIG. 14 as occurring in a particular order, this disclosure contemplates any suitable steps of the method of FIG. 14 occurring in any suitable order. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Active stylus 20 may transmit a signal to device 52 based on input from sensors 42 of active stylus 20. As an example, and without limitation, if a pressure sensor, one type of sensor that may comprise sensors 42, determines that active stylus 20 is touching device 52, then active stylus 20 may transmit a signal to device 52 that is a function of the received signal S (or, in other embodiments, a function of filtered received signal S_filter). In other embodiments, active stylus 20 may transmit a signal that is a function of received signal S (or filtered received signal S_filter) based on controller 50 determining that active stylus 20 is touching device 52. In yet other embodiments, active stylus 20 may receive data from device 52 that allows active stylus 20 to determine that active stylus 20 and device 52 are in physical contact, such that active stylus 20 transmits a signal that is a function of S or S_filter to device 52. In particular embodiments, active stylus 20 may transmit a signal to device 52 that is one function of the signal S (or S_filter) when active stylus 20 is not touching device 52, and active stylus 20 may transmit a signal to device 52 that is a different function of the signal S (or S_filter) when active stylus 20 is touching device 52.

Any of the filters 200 described in this disclosure may be used in conjunction with any suitable components or algorithms for active stylus 20, including, without limitation, the use of dynamic received-signal threshold adjustment or the use of dynamic electrode reconfiguration. The parameters of filter 200 may, in particular embodiments, be adjusted by controller 50 (or any other component of active stylus 20) based on operating characteristics of active stylus 20 or characteristics of received signal S, including SNR. In particular embodiments, either a single filter or a combination of multiple filters (e.g., of different types) may be incorporated in active stylus 20 for processing the received signal.

Herein, reference to a computer-readable non-transitory storage medium encompasses a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable non-transitory storage medium or a combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving at a stylus a receive signal from a device, the stylus comprising one or more computer-readable media embodying logic, the device comprising a touch sensor, the receive signal being received at the stylus through the touch sensor of the device and one or more electrodes of the stylus;
   filtering the receive signal for processing by the logic;
   processing by the logic the receive signal as filtered;
   if the receive signal has an amplitude between a first pre-determined threshold and a second pre-determined threshold, then transmitting from the stylus to the device a transmit signal of fixed amplitude; and
   if the receive signal has an amplitude exceeding a first pre-determined threshold and exceeding a second pre-determined threshold, then transmitting from the stylus to the device a transmit signal that is a first function of the receive signal as filtered.

2. The method of claim 1, wherein the filtering comprises applying a non-linear function to the receive signal.

3. The method of claim 2, wherein the non-linear function disproportionately amplifies low-amplitude signals.

4. The method of claim 1, wherein the filtering comprises applying a proportional gain function to the receive signal.

5. The method of claim 1, further comprising receiving, if the receive signal has an amplitude below the first pre-determined threshold and below the second pre-determined threshold, at the stylus a second receive signal from the device without transmitting from the stylus to the device a transmit signal in response to the receive signal.

6. The method of claim 1, wherein the first function is non-linear.

7. The method of claim 1, wherein the first function comprises:
   changing a phase of the receive signal as filtered; or
   multiplying by a factor the receive signal as filtered.

8. The method of claim 1, further comprising, if the stylus touches the device, then transmitting from the stylus to the device a transmit signal that is a second function of the receive signal as filtered.

9. The method of claim 1, further comprising dynamically adjusting one or more of the first threshold and the second threshold based at least in part on the receive signal.

10. One or more computer-readable non-transitory storage media embodying logic that is operable when executed to:
- receive at a stylus a receive signal from a device, the stylus comprising the media, the device comprising a touch sensor, the receive signal being received at the stylus through the touch sensor of the device and one or more electrodes of the stylus;
- filter the receive signal for processing by the logic;
- process the receive signal as filtered;
- if the receive signal has an amplitude between a first pre-determined threshold and a second pre-determined threshold, then transmit from the stylus to the device a transmit signal of fixed amplitude; and
- if the receive signal has an amplitude exceeding a first pre-determined threshold and exceeding a second pre-determined threshold, then transmit from the stylus to the device a transmit signal that is a first function of the receive signal as filtered.

11. The media of claim 10, wherein the filtering comprises applying a non-linear function to the receive signal.

12. The media of claim 11, wherein the non-linear function disproportionately amplifies low-amplitude signals.

13. The media of claim 10, wherein the filtering comprises applying a proportional gain function to the receive signal.

14. The media of claim 10, wherein one or more of the electrodes of the stylus are disposed on or in a tip of the stylus.

15. The media of claim of 10, wherein the logic is further operable when executed to receive, if the receive signal has an amplitude below the first pre-determined threshold and below the second pre-determined threshold, at the stylus a second receive signal from the device without transmitting from the stylus to the device a transmit signal in response to the receive signal.

16. The media of claim 10, wherein the first function is non-linear.

17. The media of claim 10, wherein the first function comprises:
- changing a phase of the receive signal as filtered; or
- multiplying by a factor the receive signal as filtered.

18. The media of claim 10, wherein the logic is further operable when executed to, if the stylus touches the device, then transmit from the stylus to the device a transmit signal that is a second function of the receive signal as filtered.

19. The media of claim 10, wherein the logic is further operable when executed to dynamically adjust one or more of the first threshold and the second threshold based at least in part on the receive signal.

20. The media of claim 10, wherein the transmit signal of fixed amplitude, transmitted from the stylus to the device if the receive signal has an amplitude between the first pre-determined threshold and the second pre-determined threshold, comprises a maximum-amplitude signal and corresponds to a hover mode of operation in which the stylus hovers above the touch sensor of the device.

* * * * *